US011913178B2

(12) United States Patent
Janner

(10) Patent No.: US 11,913,178 B2
(45) **Date of Patent: *Feb. 27, 2024**

(54) OSCILLATION MODULE

(71) Applicant: Hamm AG, Tirschenreuth (DE)

(72) Inventor: Peter Janner, Krummennaab (DE)

(73) Assignee: HAMM AG, Tirschenreuth (DE)

( * ) Notice: Subject to any disclaimer, the term of this patent is extended or adjusted under 35 U.S.C. 154(b) by 32 days.

This patent is subject to a terminal disclaimer.

(21) Appl. No.: 17/568,164

(22) Filed: Jan. 4, 2022

(65) Prior Publication Data

US 2022/0127799 A1 Apr. 28, 2022

Related U.S. Application Data

(63) Continuation of application No. 16/650,458, filed as application No. PCT/EP2018/075954 on Sep. 25, 2018, now Pat. No. 11,248,350.

(30) Foreign Application Priority Data

Sep. 27, 2017 (DE) ..................... 10 2017 122 370.3

(51) Int. Cl.
*E01C 19/28* (2006.01)
*B06B 1/16* (2006.01)

(52) U.S. Cl.
CPC ............ *E01C 19/286* (2013.01); *B06B 1/166* (2013.01)

(58) Field of Classification Search
CPC .............................. B06B 1/166; E01C 19/286
USPC .................................................. 404/113, 117
See application file for complete search history.

(56) References Cited

U.S. PATENT DOCUMENTS 4,647,247 A 3/1987 Sandstrom
4,927,289 A 5/1990 Artzberger
5,580,234 A * 12/1996 Wadensten ............. F04C 13/00 418/206.1
6,561,729 B1 5/2003 Potts
6,837,648 B1 1/2005 Wadensten
(Continued)

FOREIGN PATENT DOCUMENTS

CA 2782094 6/2011
CN 2507900 8/2002
(Continued)

OTHER PUBLICATIONS

International Search Report filed in PCT/EP2018/075954 dated Dec. 21, 2018.
(Continued)

*Primary Examiner* — Raymond W Addie
(74) *Attorney, Agent, or Firm* — RANKIN, HILL & CLARK LLP

(57) ABSTRACT

An oscillation module for a compacting roller of a soil compactor includes a plate-like carrier, at least two oscillation mass units supported on the carrier at a distance from one another, and an oscillation drive motor supported on the carrier. The carrier has a connection formation for firmly connecting the carrier to a carrier structure of a compacting roller. Each oscillation mass unit includes an imbalance mass rotatably supported on the carrier about an oscillation axis of rotation. Each imbalance mass of each oscillation mass unit can be driven by the oscillation drive motor for rotation about the respectively assigned oscillation axis of rotation.

25 Claims, 11 Drawing Sheets

(56) References Cited

U.S. PATENT DOCUMENTS

| | | | | |
|---|---|---|---|---|
| 7,186,056 | B2 | 3/2007 | Magee | |
| 8,961,066 | B2 | 2/2015 | Darscheid | |
| 9,039,324 | B2 | 5/2015 | Ackermann | |
| 9,574,311 | B1 | 2/2017 | Marsolek | |
| 10,072,236 | B2 | 9/2018 | O'Connell | |
| 10,072,386 | B1 * | 9/2018 | Lehtola | B06B 1/186 |
| 2004/0168531 | A1 | 9/2004 | Mitsui | |
| 2006/0147265 | A1 | 7/2006 | Fluent | |
| 2014/0064850 | A1 | 3/2014 | MacDonald | |
| 2016/0201275 | A1 | 7/2016 | Oetken | |
| 2017/0016184 | A1 | 1/2017 | Oetken | |
| 2017/0016185 | A1 * | 1/2017 | Lehtola | E02D 3/026 |
| 2017/0300290 | A1 | 2/2017 | Marsolek | |
| 2019/0145059 | A1 | 5/2019 | Meier | |

FOREIGN PATENT DOCUMENTS

| | | | |
|---|---|---|---|
| CN | 203113201 | | 8/2013 |
| EP | 1160380 | | 12/2001 |
| EP | 2504490 | | 10/2012 |
| JP | 58-500290 | | 2/1983 |
| JP | 60-144607 | | 7/1985 |
| JP | 63-315711 | | 12/1988 |
| JP | 01-290801 | | 11/1989 |
| JP | 03-125705 | | 5/1991 |
| JP | 06-316906 | | 11/1994 |
| JP | 2809530 | | 10/1998 |
| JP | 2001-342609 | | 12/2001 |
| JP | 2004-257014 | | 9/2004 |
| JP | 2004-263486 | | 9/2004 |
| JP | 2004-285826 | | 10/2004 |
| JP | 2013-512358 | | 4/2013 |
| JP | 2017-128880 | | 7/2017 |
| WO | 82/01903 | | 6/1982 |
| WO | 2013/113819 | A1 | 8/2013 |

OTHER PUBLICATIONS

Office Action of Chinese Serial No. 201880055932.2 dated Sep. 25, 2018, 11 pages.

* cited by examiner

Prior Art

Prior Art

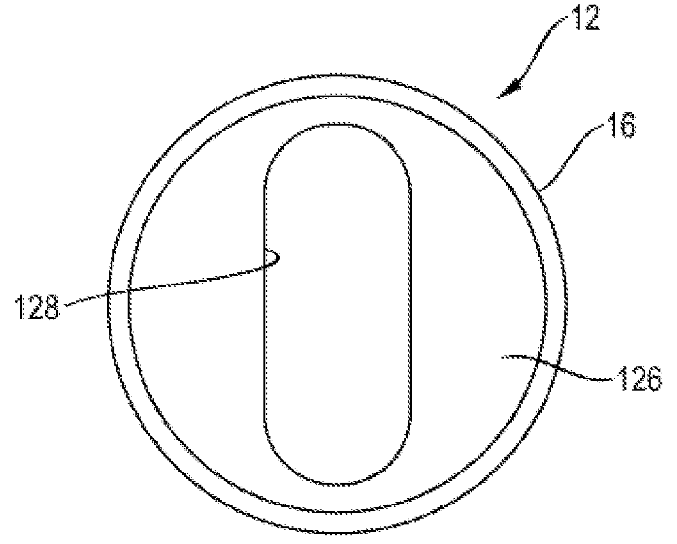
Fig. 7
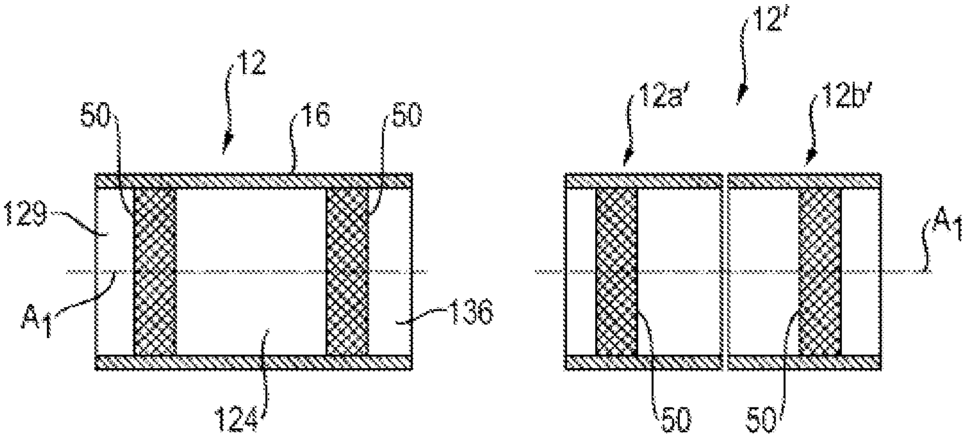
Fig. 8
Fig. 9

OSCILLATION MODULE

The present invention relates to an oscillation module for a compacting roller for a soil compactor.

In order to achieve a better compaction result when compacting substrates such as asphalt, soil or gravel, it is known to superimpose the static load on the substrate to be compacted due to the weight of a compacting roller rolling on it or of the compactor, which is supported by this on the substrate, by dynamic states of the compacting roller. For example, a compacting roller can be periodically accelerated up and down to produce a so-called vibration state, substantially vertically, that is to say in a direction substantially orthogonal to the surface of the substrate to be compacted. To generate a so-called oscillation state, an oscillation torque which periodically acts on a compacting roller in the circumferential direction about a roller axis of rotation can be generated.

A soil compactor with a compacting roller, in which such an oscillation state can be caused, is known from EP 2 504 490 B1 and is shown in FIG. 1. This known soil compactor 10 comprises two compacting rollers 12, 14 which can be rotated about respective roller axes of rotation $A_1$, $A_2$. At least one of these compacting rollers 12, 14, for example the compacting roller 12, is designed as a so-called oscillation roller and, in the interior enclosed by a roller jacket 16, comprises an oscillation arrangement 18 shown in FIG. 2 with a total of four oscillation mass units 20, 22, 24, 26. These oscillation mass units 20, 22, 24, 26 are assigned to one another in pairs and arranged opposite one another with respect to the roller axis of rotation $A_1$, that is to say at an angular distance of 180°. All oscillation mass units 20, 22, 24, 26 are driven via a common drive shaft 28 and a common oscillation drive motor, not shown, for rotation about respective oscillation axes of rotation O parallel to the roller axis of rotation $A_1$. Due to the common drive, each of the pairs of oscillating mass units 20, 22 and 24, 26, which are arranged at an axial distance from one another in the direction of the roller axis of rotation $A_1$, produces in phase an oscillating torque which periodically acts on the roller jacket 16 in the circumferential direction about the roller axis of rotation $A_1$.

Each of the oscillation mass units 20, 22, 24, 26, which are substantially identical to one another, comprises, on a respective oscillation shaft 30, two imbalance masses 32 which can be rotated with the respective oscillation shaft 30 about the respective oscillation axis of rotation O. Each oscillation shaft 30 is rotatably supported at its two axial end regions via bearing discs 34, 36 on a support structure arranged in the interior of the compacting roller 12 and firmly connected to the roller jacket 16, for example a so-called round blank. The common drive shaft 28 is also rotatably supported by bearing discs 38, for example on the same support structure(s), as the imbalance shafts 30. Corresponding to each oscillation mass unit 20, 22, 24, 26, a pulley 40 or 42 is provided on the common drive shaft 28 on the one hand and the respective imbalance shaft 30 on the other hand. The imbalance shafts 30 are driven to rotate about their respective oscillation axis of rotation O via a belt 44, for example a toothed belt, which interacts with them. The oscillating mass units 20, 22 and 24, 26, which are assigned to one another in pairs, rotate in opposite phases to each other, in order to generate in each pair of oscillating mass units 20, 22 and 24, 26 an oscillating torque which acts in the circumferential direction about the roller axis of rotation $A_1$, and which periodically acts on the compacting roller 12 and the roller jacket 16 thereof in opposite circumferential directions.

A structure of an oscillation module is known from U.S. Pat. No. 9,574,311 B1. This oscillation module has a plate-like carrier which is arranged in an axially central region of a compacting roller and is connected to the inner surface of a jacket of the compacting roller. With respect to a roller axis of rotation displaced radially outward, two oscillation mass units with imbalance masses rotatably supported in a respective oscillation mass housing are arranged on the carrier. Each of the imbalance masses is coupled to one of the two axial ends of a transmission shaft via a belt. The transmission shaft is rotatably supported in a housing-type transmission bearing hub. The transmission bearing hub is arranged with a circumferential wall thereof in a mounting opening provided centrally in the carrier. On axial end regions of the circumferential wall, floors are supported on this, which are penetrated by the transmission shaft and rotatably support the transmission shaft near their axial end regions via respective bearings. The transmission shaft is coupled to a rotor of an oscillation drive motor via an imbalance drive shaft and can thus be driven to rotate by the latter.

It is the object of the present invention to propose measures which are simple to construct and by means of which a compacting roller can be acted upon in order to carry out an oscillation.

According to the invention, this object is achieved by an oscillation module for a compacting roller of a soil compactor, comprising:

- a plate-like carrier, wherein the carrier has a connection formation for firmly connecting the carrier to a carrier structure of a compacting roller,
- at least two oscillating mass units supported on the carrier at a distance from one another, each oscillating mass unit comprising an imbalance mass rotatably supported on the carrier about an oscillation axis of rotation,
- an oscillation drive motor supported on the carrier, wherein each imbalance mass of each oscillation mass unit can be driven by the oscillation drive motor for rotation about the respectively assigned oscillation axis of rotation.

Due to the modular design of an oscillation arrangement, it becomes possible to integrate such an oscillation arrangement to be referred to as an oscillation module as a preassembled unit in a compacting roller, for example by the connection formation of the carrier of the oscillation module being fixed to an assigned carrier structure in the interior of a compacting roller. As a result, no further work is required to integrate individual components of an oscillation arrangement into the interior of the compacting roller. This not only simplifies the process of installing such a modularly provided oscillation arrangement in the interior, but also simplifies the structure of the entire compacting roller itself, since in the interior no individual components or components receiving or, for example, rotatably supporting system regions of an oscillation arrangement, have to be provided.

For a stable rotary bearing of an imbalance mass on the carrier, it is proposed that at least one, preferably each oscillating mass unit comprises an imbalance mass bearing projection supported on the carrier and at least one imbalance mass rotatably supported on the imbalance mass bearing projection about the oscillation axis of rotation, and/or that at least one, preferably each oscillation mass unit preferably comprises an imbalance mass with an imbalance shaft that is rotatably supported on the carrier about an oscillation axis of rotation.

In the case of a configuration which is particularly advantageous with regard to a stable rotary bearing of the imbalance masses, it is proposed that in at least one, preferably each oscillating mass unit, the imbalance mass bearing projection is supported on the carrier in its first axial end region and is self-supporting in its second axial end region. Stabilisation can further be ensured by the fact that in at least one, preferably each, oscillating mass unit, the imbalance mass bearing projection is supported on the carrier in its first axial end region and is supported in its second axial end region with respect to the imbalance mass bearing projection of at least one other oscillation mass unit or with respect to the carrier. Furthermore, it can be provided that at least one, preferably each, imbalance mass is rotatably supported on the associated imbalance mass bearing projection, for example in the region of its second axial end region, by an imbalance mass bearing, wherein the imbalance mass bearing comprises a bearing inner ring supported on or provided by the imbalance mass bearing projection and a bearing outer ring supported on or provided by the imbalance mass. In contrast to the prior art, the oscillation mass units designed according to the invention therefore do not comprise any imbalance masses which are to be rotatably supported and which support or provide the imbalance masses, but rather imbalance masses which are rotatably supported on an imbalance mass bearing projection which acts as a bearing journal.

For this purpose it can be provided, for example, that at least one, preferably each imbalance mass comprises an imbalance mass ring body rotatably supported on the associated imbalance mass bearing projection and at least one imbalance mass element provided on the imbalance mass ring body.

To generate an imbalance, it is proposed that an imbalance mass element be arranged on at least one, preferably each imbalance mass on at least one, preferably both axial end faces of the imbalance mass ring body and preferably detachably connected to the imbalance mass ring body. For example, such an imbalance mass element can be screwed to the imbalance mass ring body, so that the imbalance moment of the imbalance masses can be adjusted in a simple manner in association with various configurations of a compacting roller.

A reliable drive interaction, which substantially does not limit the positioning of the oscillation mass units with respect to the oscillation drive motor, can be provided, for example, in that at least one, preferably each, imbalance mass can be driven to rotate by means of the oscillation drive motor by means of a belt drive.

The belt drive, in association with at least one, preferably each imbalance mass on the oscillation drive motor, can comprise a belt drive pulley, preferably a toothed pulley, which can be rotated about a drive axis of rotation, on the imbalance mass a belt driven pulley, preferably a toothed pulley, and a belt, preferably a toothed belt, which interacts with the belt drive pulley and the belt driven pulley.

A structurally particularly simple configuration can be achieved in that the belt driven pulley provides the imbalance mass ring body for at least one, preferably each imbalance mass. It can further contribute to such a simple configuration that the belt drive pulley interacts with at least two belts for driving at least two imbalance masses of different oscillation mass units, wherein the belt drive pulley has successive belt interaction regions for interaction with the belts in the direction of the drive axis of rotation.

The imbalance mass ring bodies each providing a belt driven pulley can be identical to one another, which allows the use of identical parts, and/or can be positioned in the direction of the drive axis of rotation in the same axial region, so that on the one hand an easy to implement drive interaction with the oscillation drive motor can be guaranteed, and on the other hand, the occurrence of tilting moments is avoided.

In order to achieve a reliable drive interaction between the belt or belts and the associated belt pulleys, it is proposed that a belt tensioning roller is provided in association with at least one, preferably each belt, preferably wherein at least one belt tensioning roller increases a circumferential interaction length between the belt and the belt drive pulley and/or belt driven pulley cooperating therewith.

The oscillation drive motor can comprise a motor housing supported on the carrier, positioned substantially on a first axial side of the carrier, and a motor shaft which penetrates an opening in the carrier and interacts with the oscillating mass units in a drive interaction on a second axial side of the carrier. This ensures an axially compact and stable construction of the entire module, since its system regions are distributed on both axial sides of the plate-like carrier. For this purpose, it can in particular also be provided that the oscillation mass units are arranged on the second axial side of the carrier. Furthermore, for a compact design, the oscillation drive motor can be supported on the carrier via a roller drive motor.

For a stable mounting of a motor shaft of the oscillation drive motor, it is proposed that on the second axial side of the carrier the opening in the carrier is arranged surrounding a preferably pot-like housing rotatably supporting the motor shaft of the oscillation drive motor. It can be provided for an easy to implement structure that the housing is fixed to the carrier together with the roller drive motor. Furthermore, at least one, preferably each belt tensioning roller can be supported on this housing.

A structure of the oscillation mass units that is protected against external influences can provide that at least one, preferably each, oscillation mass unit comprises an oscillation mass housing with a circumferential wall accommodated in an opening of the carrier and at both axial end regions of the circumferential wall in each case a base that rotatably supports an imbalance mass.

In order to ensure efficient generation of an oscillation torque, it is proposed that a drive axis of rotation of the oscillation drive motor and the oscillation axes of rotation of at least two oscillation mass units are parallel to one another and/or lie in a common plane.

For a fixed connection of an oscillation module to a compacting roller or a roller jacket thereof, it can be provided that the connection formation comprises a plurality of connection bolt passage openings on an outer circumferential region of the carrier.

A stable, yet easy to implement connection of the oscillation mass units to the carrier can be realised, for example, in that at least one, preferably each, imbalance mass bearing projection on the carrier is fixed by a plurality of fastening elements, and/or that at least one, preferably each imbalance mass bearing projection is formed in one piece with the carrier.

The invention further relates to a soil compactor comprising at least one compacting roller rotatable about a roller axis of rotation with at least one oscillation module constructed according to the invention.

For an easy-to-implement integration of such an oscillation module into the compacting roller, it is proposed that the at least one compacting roller comprises a roller jacket that encloses an interior space, wherein in association with the at least one oscillation module in the interior space, a torque-proof relative to the roller jacket, preferably disc-like support structure, for example a round blank, is provided and the support of the at least one oscillation module with its connection formation is fixed to the support structure assigned to it.

For efficient generation of an oscillation movement of the compacting roller, it is proposed that two oscillation modules be arranged at a distance from one another in the direction of the roller axis of rotation in the compacting roller.

In this case, at least one compacting roller can be a divided compacting roller with compacting roller sections which follow one another in the direction of the roller axis of rotation, wherein at least one oscillation module is arranged in each compacting roller section. Alternatively or additionally, at least one compacting roller can be an undivided compacting roller, wherein an oscillation module is preferably arranged in each axial end region of the compacting roller such that it is substantially completely axially covered by a roller jacket of the compacting roller in the direction of the roller axis of rotation.

The present invention is described in detail below with reference to the accompanying figures. In which:

FIG. 7 shows an axial view of a compacting roller for receiving an oscillation module from FIG. 3;

FIG. 8 shows a basic longitudinal sectional illustration of an undivided compacting roller with two oscillation modules integrated in it;

FIG. 9 shows a view corresponding to FIG. 8 of a divided compacting roller with an oscillation module in each of the two compacting roller regions;

FIGS. 3 to 5 show a first embodiment of an oscillation module which, in the case of a soil compactor, for example the soil compactor of FIG. 1, can be integrated into at least one of the two compacting rollers 12, 14 thereof.

Figure 1:
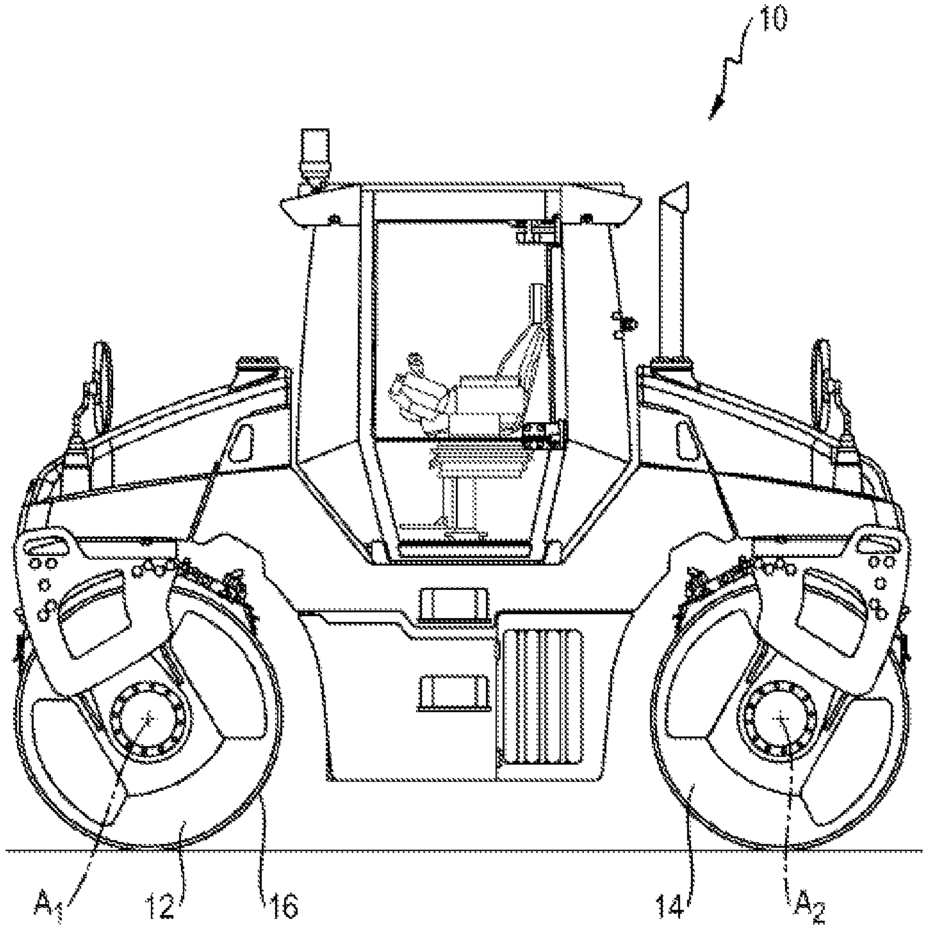
FIG. 1 shows a side view of the soil compactor known from the prior art with two compacting rollers.
Figure 2:
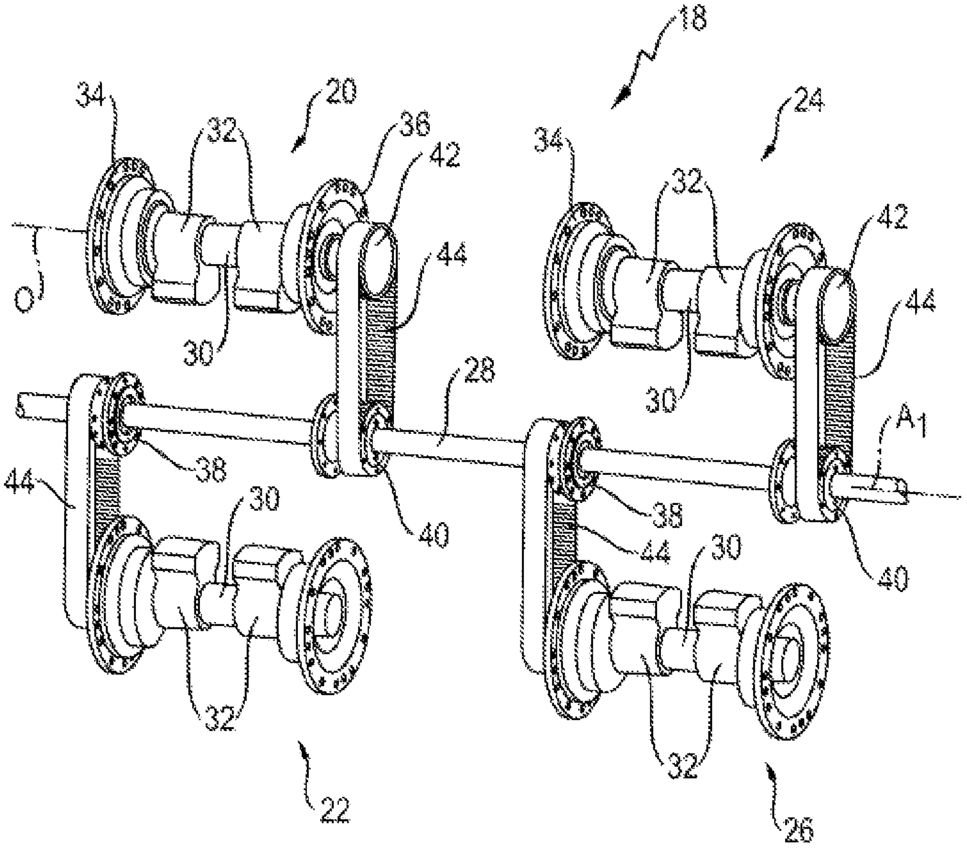
FIG. 2 shows an oscillation arrangement of a compacting roller of the soil compactor of FIG. 1.
Figure 3:
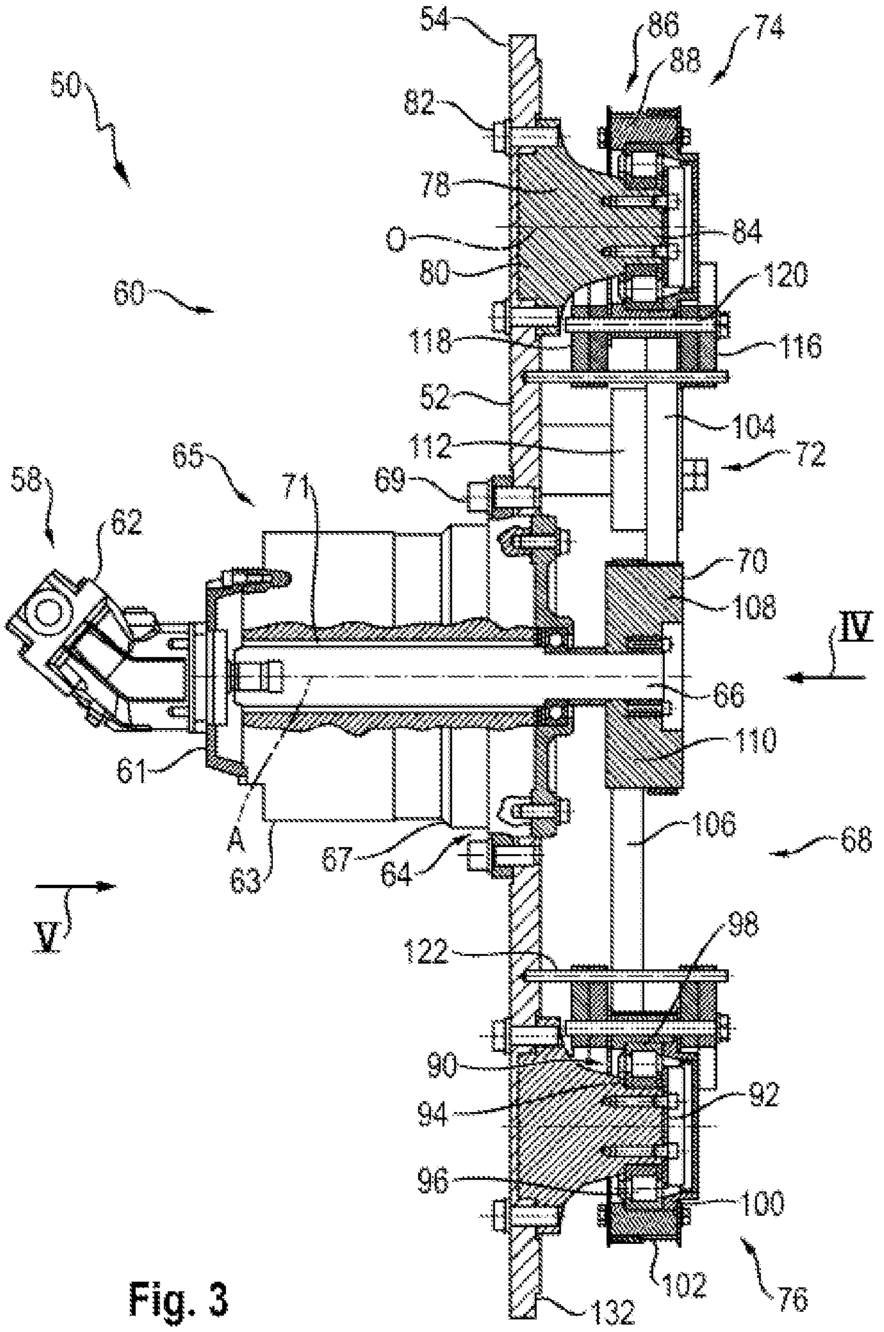
FIG. 3 shows a longitudinal sectional view of an oscillation module constructed according to the invention, cut along a line III-III in FIG. 4.
Figure 4:
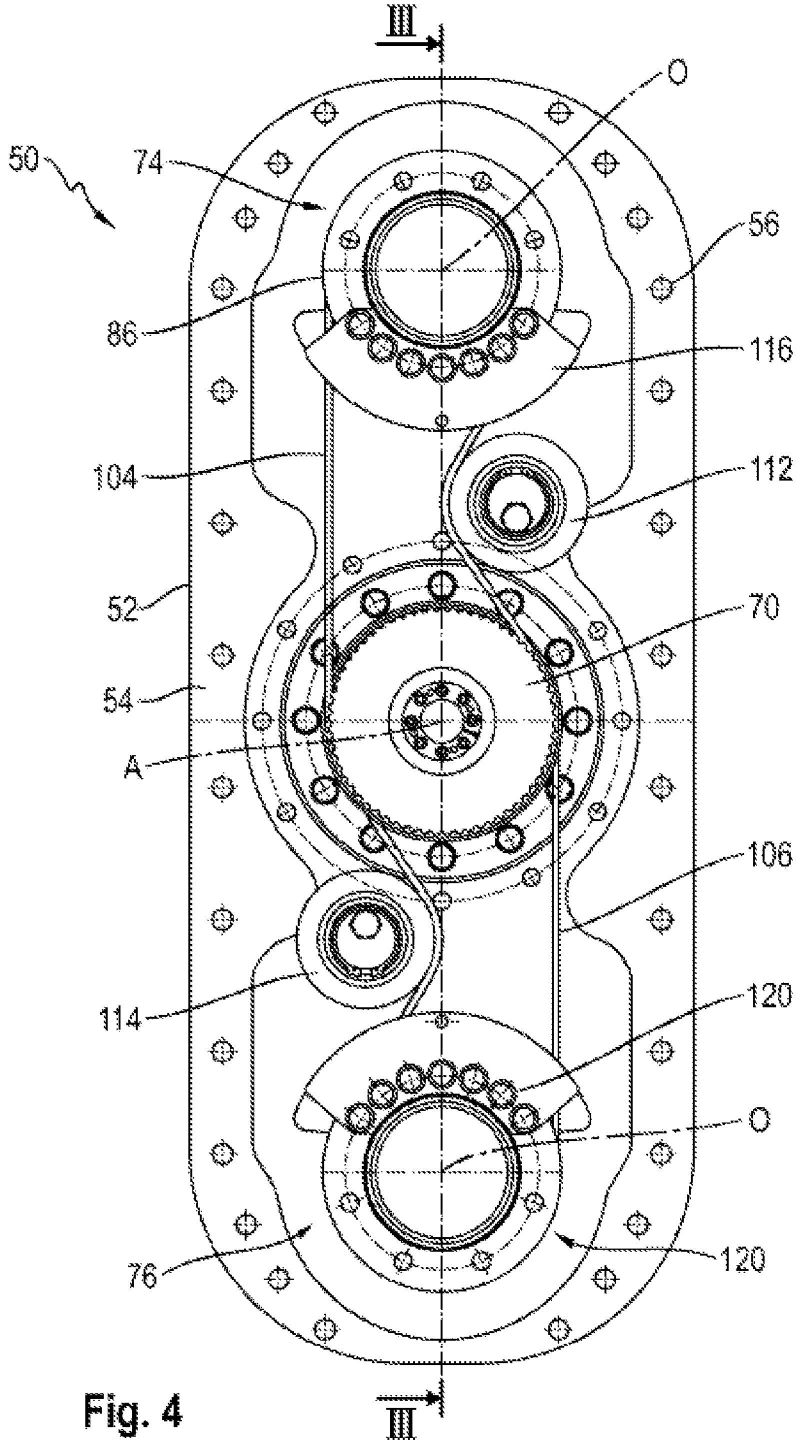
FIG. 4 shows an axial view of the oscillation module of FIG. 3 looking in the direction IV in FIG. 3.
Figure 5:
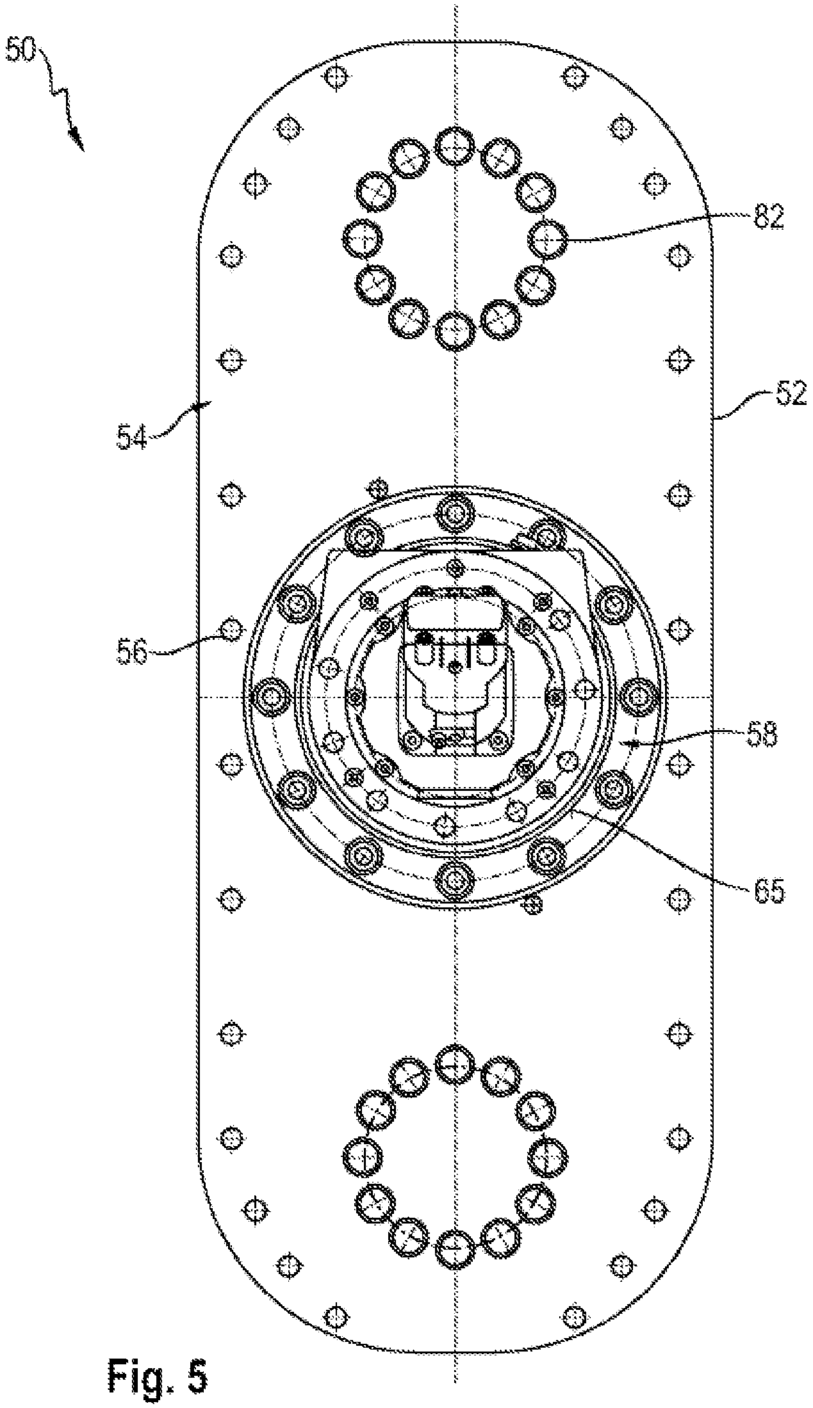
FIG. 5 shows an axial view of the oscillation module of FIG. 3 looking in the direction V in FIG. 3.

The oscillation module, generally designated 50 in FIGS. 3 to 5, comprises a plate-like carrier 52 constructed of metal material, preferably sheet metal material, cast material or the like, with, as FIGS. 4 and 5 clearly show, a fundamentally elongated or rounded rectangular circumferential contour. A round, e.g. circular circumferential contour of the carrier 52 can be provided. A connection formation, generally designated 54, is provided in the outer circumferential region of the plate-like carrier 52. This comprises a plurality of connecting bolt passage openings 56 arranged at a distance from one another along the outer circumference of the plate-like carrier 52. By means of connecting bolts, for example screw bolts, which extend through these connecting bolt passage openings 56, the oscillation module 50 can be fixed in a compacting roller in a manner which will be described below.

In a central area of the plate-like carrier 52, an oscillation drive motor 58, for example designed as a hydraulic motor, alternatively also as an electric motor, is provided. The oscillation drive motor 58 comprises a motor housing 62 which is substantially supported or positioned on a first axial side 60 of the carrier 52. The motor housing 62 is supported by means of a connecting element 61 on a non-rotating area 63 of a roller drive motor, generally designated 65 and in particular designed as a hydraulic motor. A rotating region 67 of the roller drive motor 65 is arranged in the region of a central opening 64 of the carrier 52 and is fixed to the carrier 52 by screw bolts 69. Within the meaning of the present invention, the roller drive motor 65 with its non-rotating region 63 and its rotating region 67 thus forms a region of the motor housing 62 of the oscillation drive motor 58 with regard to the carrying functionality provided for the oscillation drive motor 58. In an embodiment of a compacting roller, in which no roller drive motor is to be provided at this point, the oscillation drive motor 58 can be connected to the carrier 52 directly or via a region of the motor housing 62 which takes over the carrying functionality of the roller drive motor 65.

A motor shaft 66 of the oscillation drive motor 58, which extends in the direction of a drive axis of rotation A and extends through a central opening 71 of the roller drive motor 65 and through the central opening 64 in the carrier 52, lies with its free end region substantially on a second axial side 68 of the carrier 52 and supports there a belt drive pulley 70, preferably designed as a toothed pulley, of a belt drive generally designated with 72. The motor shaft 66 can be connected for common rotation to a rotor of the oscillation drive motor 58 which projects from the motor housing 62 and is rotatably mounted therein, or can be integrally formed therewith.

Two oscillation mass units 74, 76 are provided on the carrier 52, arranged with respect to the drive axis of rotation A opposite one another and substantially at the same distance from it. The two oscillation mass units 74, 76 preferably basically have the same structure, so that their structure is described in the same way with reference to both oscillation mass units 74, 76.

Each of the two oscillation mass units 74, 76 comprises an imbalance mass bearing projection 78, which is fixed in its first axial end region 80 by a plurality of fastening elements 82, for example screw bolts, on the carrier 52, in particular the second axial side 68 thereof. For a defined positioning, the bearing projection 78 can have a positioning projection engaging in a corresponding positioning recess of the carrier 52 in the first axial end region 80. Each imbalance mass bearing projection 78, which provides a substantially self-supporting or free-standing bearing journal, supports an imbalance mass 86 in its second axial end region 84 so that it can rotate about a respective oscillation axis of rotation O. Each imbalance mass 86 comprises an imbalance mass ring body 88 which is rotatably supported on the imbalance mass bearing projection 78 via an imbalance mass bearing 90. The imbalance mass bearing 90 comprises a bearing inner ring 94 fixed by a fixing plate 92 on the second axial end region 84 of the imbalance mass bearing projection 78, as well as a bearing outer ring 98 rotatably mounted on the bearing inner ring 94, for example via a plurality of roller bodies such as balls or rolls 96. The bearing outer ring 98 is fixed on the imbalance mass ring body 88 via a fixing element 100, so that the imbalance mass ring body 88 is held in a defined manner on the respectively assigned imbalance mass bearing projection 78 in the axial direction with respect to a respective oscillation axis of rotation O. It can be clearly seen in FIG. 3 that due to the mutually identical design, the two imbalance masses 86 or their imbalance mass ring bodies 88 are axially aligned with one another, that is to say are positioned in the same axial region.

Each imbalance mass ring body 88 is designed as a toothed pulley and thus provides a respective belt driven pulley 102. Corresponding to each imbalance mass 86, the belt drive 72 comprises in each case a belt 104, 106, wherein the two belts 104, 106 are offset from one another or lying next to one another in the direction of the axis of rotation A, so that each belt 104, 106 cooperates with a belt interaction region 108 or 110 of the belt drive pulley 70 respectively assigned to it or is guided around this area. This leads to the fact that the belts 104, 106 cooperate with the assigned belt driven pulleys 102 or imbalance mass ring bodies 88 in correspondingly offset axial regions. Since the belt driven pulleys 102, like the belt drive pulley 70, are designed as toothed pulleys, the belts 104, 106 are preferably designed as toothed belts for a defined drive interaction.

In order to be able to maintain a defined tension for the two belts 104, 106, a belt tensioning roller 112 or 114 is provided in association with each of the two belts. The belt tensioning rollers 112, 114 lie radially with respect to the drive axis of rotation A substantially between the drive axis of rotation A and the respective oscillation axes of rotation O and are mutually offset in relation to one another with respect to a plane containing the drive axis of rotation A and the two oscillation axes of rotation O.

The two belt tensioning rollers 112, 114 rotatably supported on the carrier 52 not only maintain a defined tension of the belts 104, 106, but also ensure that, due to the fact that the respective belt tensioning rollers 112, 114 between the belt drive pulley 70 and the respective belt driven pulley 102 press running belt sections against each other, the degree of wrap of the belts 104, 106 is increased both by the belt drive pulley 70 and by the respectively assigned belt driven pulley 102, which ensures an improved drive interaction due to a correspondingly increased or extended toothed engagement region. It should be pointed out that, in principle, such an arrangement of the belt tensioning rollers 112, 114 is also possible, in which the sections of the belts 104, 106 running between the respective belt pulleys are not tensioned towards one another but rather away from one another. Due to the increase in the degree of wrap and the compact design, the embodiment shown in the figures is particularly advantageous.

Each of the imbalance masses 86 preferably comprises an imbalance mass element 116, 118, which is constructed, for example, with two parts, on both axial sides of the imbalance mass ring body 88. The two imbalance mass elements 116, 118 are fixedly connected to one another and the respectively associated imbalance mass ring body 88 by means of screw bolts 120 and ensure that the centre of gravity of each imbalance mass 86 is eccentric to the respective oscillation axis of rotation O, so that when the imbalance mass 86 rotates about the assigned oscillation axis of rotation O, an imbalance torque arises. At least one of the imbalance mass elements 116, 118 or a part thereof could also be formed integrally, i.e. in one piece, with the associated imbalance mass ring body 88.

In order to generate an oscillation torque directed in the circumferential direction about the drive axis of rotation A, which fundamentally also corresponds to a roller axis of rotation of a compacting roller having such an oscillation module 50, the two imbalance masses 86 are basically positioned in opposite phase to one another. This means that, as shown for example in Fi. 3, in a mounting position, i.e. a state in which the module 50 or its system components are assembled, the centre of gravity of the two imbalance masses 86 are at a minimal distance from one another, which also means that the respective imbalance mass elements 118, 116 of the two imbalance masses 86 are at a minimal and thus also a minimal distance from the drive axis of rotation A. In order to be able to predefine this positioning for each imbalance mass 86, a pin-like mounting aid element 122 can be provided, which passes through assigned openings in the imbalance mass elements 116, 118 and engages in a corresponding opening in the carrier 52. This ensures that the two imbalance masses 86 assume a defined positioning with respect to one another when the two belts 104, 106 are placed around them or around the belt drive pulley 70. Once this is done, the mounting aid elements 122 can be removed, i.e. are pulled out of the openings receiving these, so that the two imbalance masses 86 can rotate about their respective oscillation axis of rotation O, driven by the oscillation drive motor 58. The two imbalance masses 86 rotate in the same direction, but in opposite phase to one another and also in the same direction with the belt drive pulley 70, as a result of which the aforementioned oscillation torque, which is oriented around the drive axis of rotation A, i.e. a torque with a periodically reversing direction of action about the drive axis of rotation A, is generated.

It should be pointed out here that, in particular for generating such an oscillation torque, the opposite phase positioning of the two imbalance masses 86 is necessary or particularly advantageous. In a different phase relationship to one another, other types of oscillating forces, for example substantially also linear, that is to say oriented not in the circumferential direction about a respective roller axis of rotation but rather substantially orthogonally thereto, can be generated. For the purposes of the present invention, this too is to be understood as an oscillation, but without generating a torque that oscillates about a roller axis of rotation, but rather with generating an oscillating force that is directed, for example, orthogonally to a respective roller axis of rotation. It should also be pointed out that, in particular, for the two imbalance masses 86 to be able to be positioned more freely in the radial direction with respect to the drive axis of rotation A, coupling them to the oscillation drive motor 58 via the belt drive 72 is particularly advantageous, in particular since this can also ensure in a particularly simple manner that both imbalance masses 86 rotate in the same direction. Alternatively, however, the two imbalance masses 86 could also be coupled to the oscillation drive motor 58 via a respective gear mechanism, which also makes it possible, for example, to easily specify different directions of rotation for the two imbalance masses, which further increases the range of periodic and, for example, linearly directed forces that can be generated.

Figure 6:
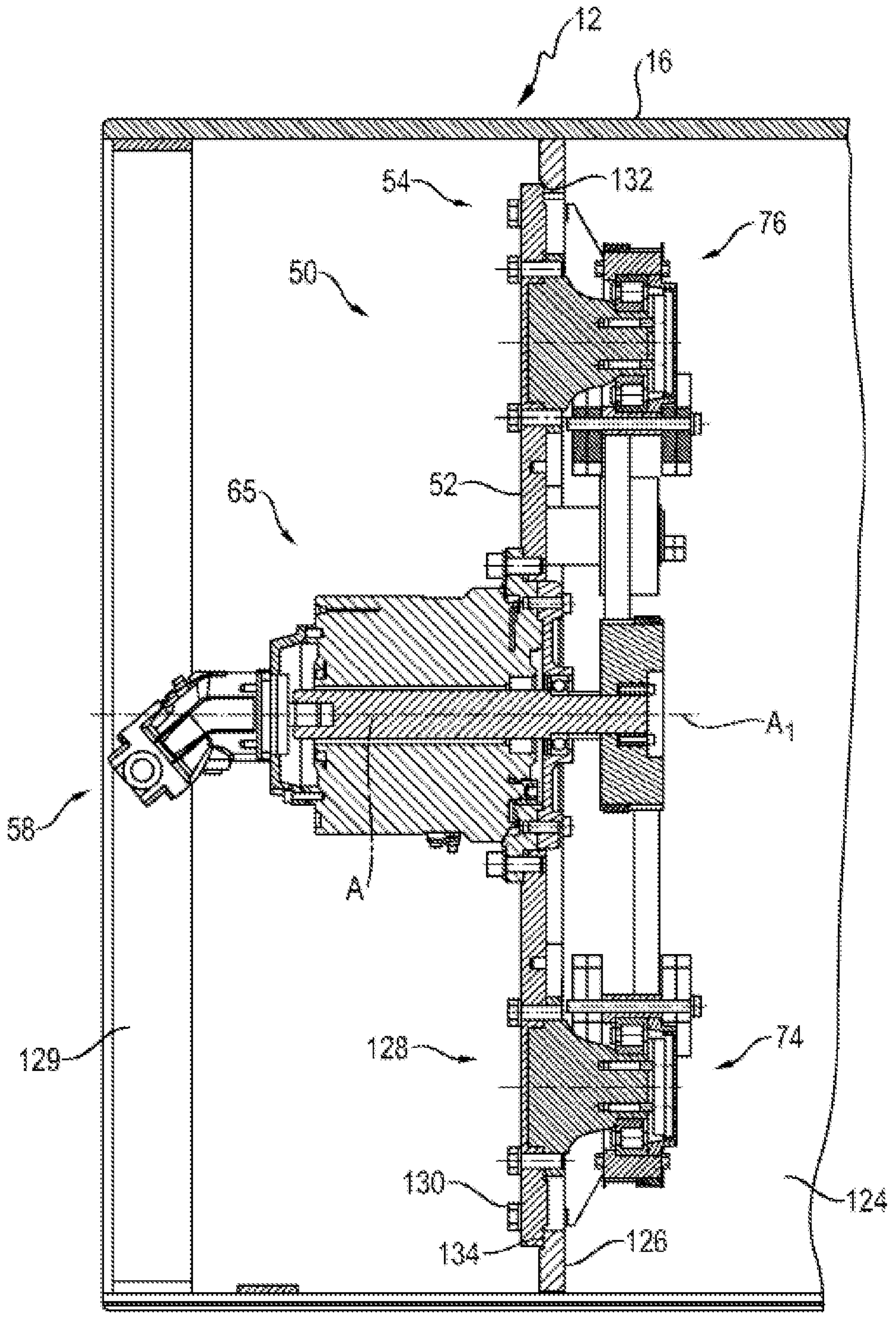
FIG. 6 shows an oscillation module from FIG. 3 integrated in a compacting roller.

FIG. 6 shows the integration of such an oscillation module 50 into a compacting roller, for example the compacting roller 12 of the soil compactor 10. Provided in the interior 124 enclosed by the roller jacket 16 of the compacting roller 12 is a support structure 126, for example in the form of a disc and fixed on its outer circumference, for example by welding to the roller jacket 16, which can also be generally referred to as a round blank. This support structure 126, which can be seen in an axial view in FIG. 7, has an elongated opening 128 which is adapted to the outer circumferential contour of the support 52 of the oscillation module 50 and into which the oscillation module 50 can be inserted from the axial end region 129 of the roller jacket 16. The carrier 52 is fixed in a defined position on the carrier structure 126 by a plurality of connecting bolts 130, for example screw bolts, which pass through the connecting bolt passage openings 56 which can be seen in FIG. 5 and are screwed into corresponding internal thread openings of the carrier structure 126. For this purpose, the carrier 52 and the carrier structure 126 can each have axially offset positioning regions 132, 134 in their overlapping edge regions.

The positioning of the oscillation module 50 in the compacting roller 12 is preferably such that in the direction of the roller axis of rotation $A_1$, which corresponds to the drive axis of rotation A of the oscillation drive motor 58, the oscillation drive motor 58 is substantially completely accommodated in the interior 124, that is to say does not protrude beyond the roller jacket 16 substantially in the direction of the roller axis of rotation $A_1$. A disruptive interaction with the frame parts of the soil compactor 10 which rotatably support the compacting roller 12 is thus avoided.

The modular design makes it possible to mount the entire oscillation module 50 before it is integrated into a compacting roller, in particular also those system regions which, lying on the second axial side 68 of the carrier 52, are to be positioned in a region that is difficult to access in the interior 124. The entire module can be prefabricated and inserted into the compacting roller 12. Further mounting processes for attaching other system regions of an oscillation arrangement provided by the oscillation module 50 inside the compacting roller 12 are fundamentally not necessary.

The modular design also makes it possible, for example, to be able to generate different imbalance torques or oscillation torques by selecting the mass and/or shape of the respective imbalance mass elements to adapt to different sizes of compacting rollers. This also increases the modular character, since in principle, identical parts can be accessed for equipping differently dimensioned compacting rollers. This also applies to the construction of each oscillation module 50 itself, since identical components can also be used there in particular in each of the imbalance mass units 74, 76.

FIG. 8 illustrates in a basic representation the equipment of a compacting roller 12 with two oscillation modules 50 constructed according to the invention. These are each positioned near the axial end regions 129, 136 of the roller jacket 16 in the manner described above with reference to FIG. 6. Each of the two oscillation modules 52 can be operated independently of the respective other oscillation module, so that each oscillation module 50 can generate an oscillation torque that is freely adjustable in its phase position with respect to the respective other module and also in its frequency. In particular, by varying the phase position of the oscillation torques generated by the two oscillation modules 50, it becomes possible to achieve a destructive or a constructive superimposition of the two oscillation torques, so that the amplitude of the total oscillation torque generated by the superimposition can be varied on the one hand, namely by changing the phase position of the two oscillation torques generated by the oscillation modules 50, 52, and on the other hand its frequency can be varied independently of the amplitude of the total oscillation torque, in that the rotational speed of the respective oscillation drive motor 58 is varied accordingly in the two oscillation modules 50.

While an undivided compacting roller 12 is shown by way of example in FIG. 8, FIG. 9 shows a divided compacting roller 12' with two compacting roller regions 12*a*' and 12*b*' lying next to one another in the direction of the roller axis of rotation $A_1'$. These two compacting roller regions 12*a*' and 12*b*', which together provide a divided compacting roller 12', are each equipped with an oscillation module 50, so that each of the two compacting roller regions 12*a*', 12*b*' can independently generate an oscillating torque independently of the other compacting roller region.

Various variations of an oscillation module are described below with reference to FIGS. 10 to 13, which are fundamentally based on the same construction concept described above. In FIGS. 10 to 13, the same reference numerals are used for components or system regions which correspond to components or system regions described above with reference to FIGS. 3 to 9.

Figure 11:
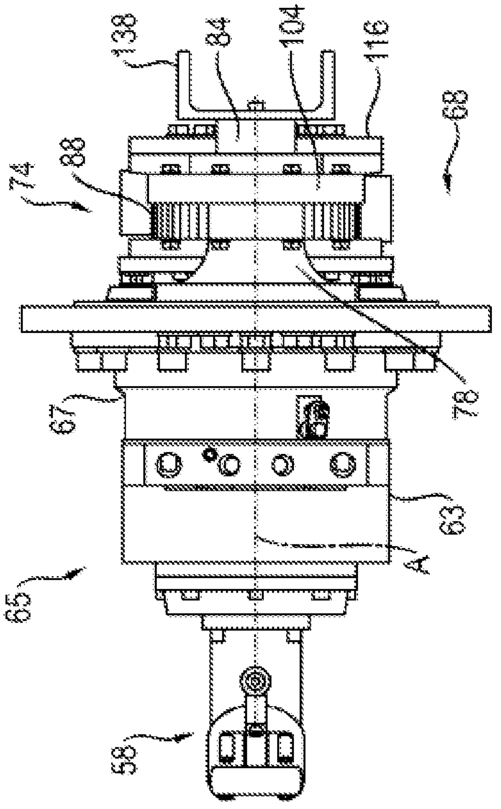
FIG. 11 shows a side view of the oscillation module of FIG. 10 looking in the direction XI in FIG. 10.
Figure 10:
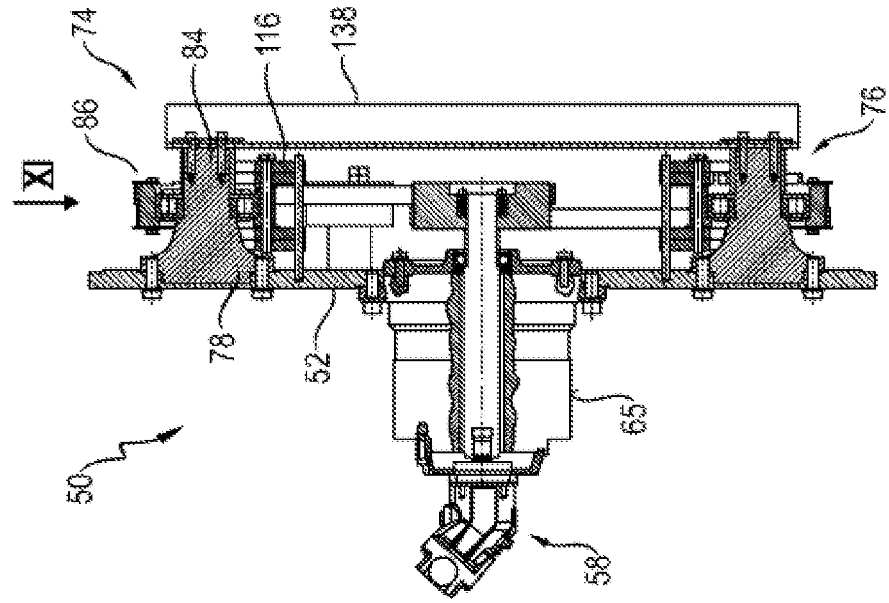
FIG. 10 shows an illustration of an oscillation module of an alternative embodiment corresponding to FIG. 3.

FIGS. 10 and 11 show an embodiment of an oscillation module 52, in which, in order to increase the rigidity or stability, the two imbalance mass bearing projections 78 are supported in relation to one another in their second axial end regions 84 by means of a support body 138, for example in the form of a U-profile carrier. The imbalance mass bearing projections 78, which are generally self-supporting with respect to the carrier 52, are thus supported against one another at their free ends, so that even at comparatively high rotational speeds and thus large imbalance moments generated in the region of each oscillation mass unit 74, 76, a wobble movement of the imbalance mass bearing projections 78 in the region of their respective imbalance masses 86 rotatably supporting second axial end regions 84 is avoided.

To connect the support body 138 to the imbalance mass bearing projections 78, e.g. by means of screw bolts, these can be extended in their second axial end regions 84 in order to ensure that there is sufficient installation space for the free rotation of the imbalance mass elements 116 which are positioned away from the carrier 52. Nevertheless, it can also be said in this embodiment that the imbalance masses 56 are rotatably supported on the imbalance mass bearing projections 78 substantially in the second axial end regions 84 thereof. In a modification of this type of embodiment, at least one imbalance mass bearing projection 78 could be supported in its second axial end region 84 by a support body with respect to the carrier 52.

Figure 12:
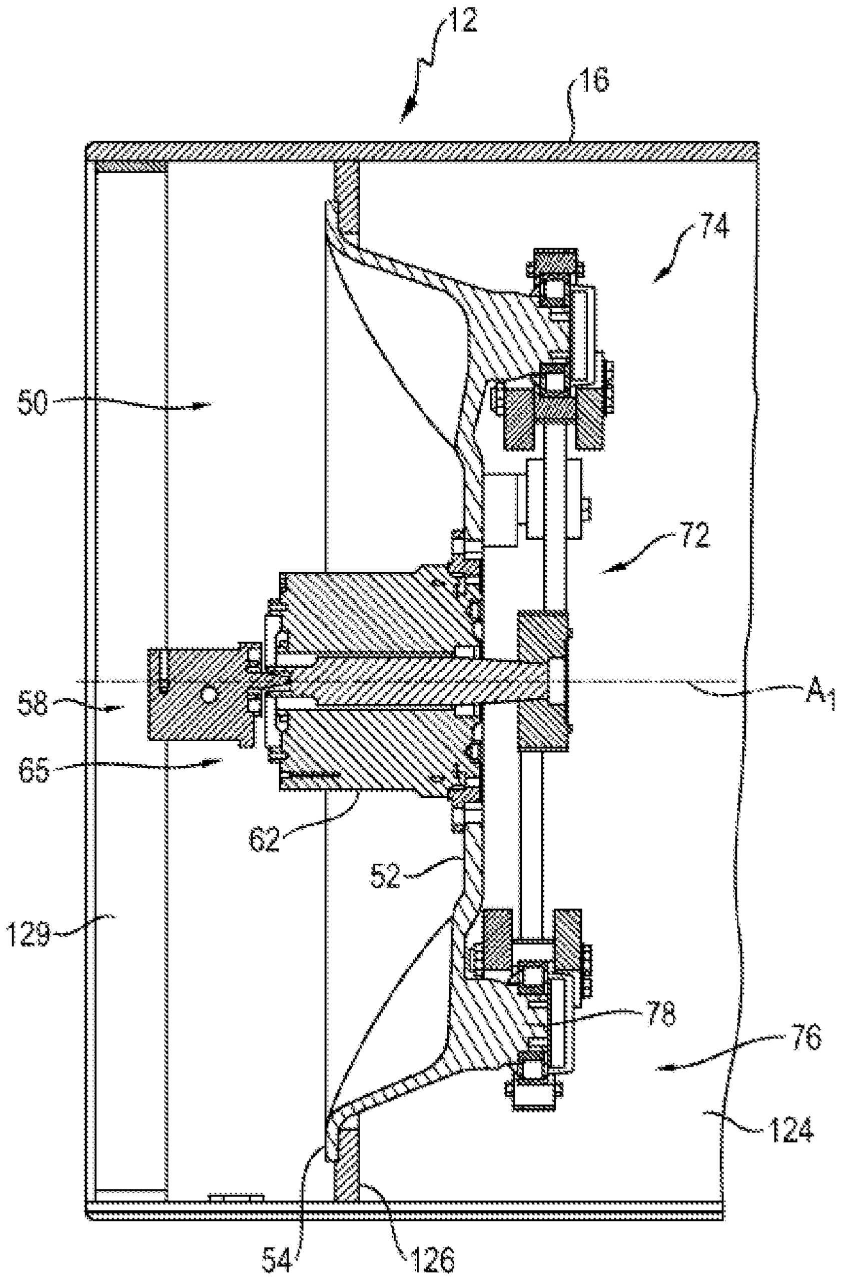
FIG. 12 shows a further alternative embodiment of an oscillation module integrated in a compacting roller.

FIG. 12 shows an embodiment of an oscillation module 50 integrated in a compacting roller 12, in which the fundamentally plate-like carrier 52 can have a three-dimensional shape and is produced, for example, as a cast component, while, for example, in the previously described embodiments, the carrier 52 can be designed as a stamped or cut-out component. In the exemplary embodiment shown in FIG. 12, the imbalance mass bearing projections 78 of the two oscillation mass units 74, 76 are formed integrally, that is to say in one piece, with the carrier 52, thus as a block of material. This increases the stability and avoids operations for mounting the imbalance mass bearing projections 78 on the carrier 52.

Furthermore, FIG. 12 clearly shows that, when manufactured as a cast component, it is comparatively easy to give the support 52 a three-dimensionally shaped structure, so that its connection formation 54, to be connected to the support structure 126 or the outer circumferential region of the support 52 with respect to that region in which the housing 62 of the oscillation drive motor 58 is fixed on the carrier 52, may be axially offset. This allows the substantial system regions of the oscillation module 50 to be shifted further inward in the direction of the roller axis of rotation $A_1$, although the support structure 126 is positioned comparatively close to the axial end region 129 of the roller jacket 16.

It should be pointed out that such a three-dimensional shaping of the carrier 52 can in principle also be implemented in the structure described above with reference to FIGS. 3 to 5, for which purpose, for example, the carrier 52, which is initially provided planar, that is to say substantially as a flat component, is subjected to a corresponding deformation. Such a three-dimensionally shaped carrier 52 could also be provided by assembling a plurality of individual parts, which can be connected to one another for example by welding and/or screwing or the like.

Figure 13:
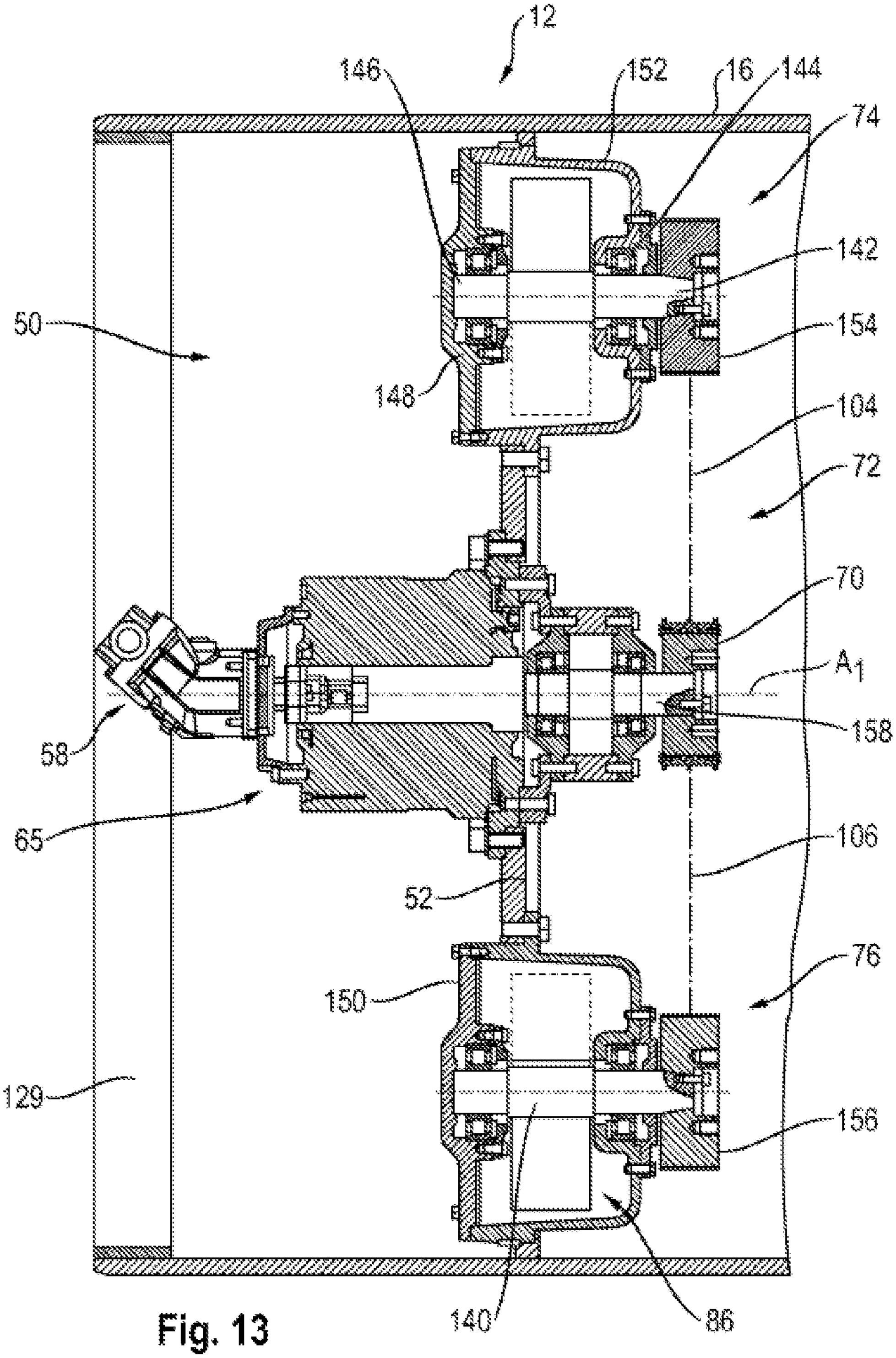
FIG. 13 shows a further alternative embodiment of an oscillation module integrated in a compacting roller.

FIG. 13 shows a further alternative embodiment of an oscillation module 50 constructed with two imbalance mass units 74, 76. In this type of embodiment of an oscillation module 50, the two oscillation mass units 74, 76 each have an imbalance mass 86 formed with an imbalance shaft 140. The imbalance shaft 140 is rotatably supported in an axial end region 142 on the carrier 52, which is provided, for example, as a cast component, via an imbalance mass bearing 144 and is rotatably supported in its other axial end region 146 via an imbalance mass bearing 148 on a cover-like or plate-like support body 150. To accommodate a respective imbalance mass 86, the carrier 52 can have a pot-like shape 152, which can be closed off by the support body 150 in the region of the second axial end region 146 of the imbalance shaft 140.

Outside the volume delimited in this way and holding the imbalance mass 86 or one or a plurality of imbalance mass elements of the oscillation mass unit 74, a belt driven pulley 154 is connected to the imbalance shaft 140 in the region of the first axial end region 142. This is in drive connection with the belt drive pulley 70 via a belt 104 which is only indicated in principle, while in a corresponding manner the imbalance mass 86 of the other oscillation mass unit 76 is in drive connection with the belt drive pulley 70 via a belt driven pulley 156 and the belt 106. The belt drive pulley 70, in turn, can be supported at a greater axial distance from the housing 62 of the oscillation drive motor 58 on a shaft 158 which extends or continues the motor shaft of the oscillation drive motor 58 or is provided by the latter itself.

With this type of embodiment, too, the module character is achieved since all system regions of an oscillation module 50 can be provided on the plate-like carrier 52 and can be arranged together with the latter in the interior 124 of the compacting roller 12 and fixed on the carrier structure 126.

Figure 14:
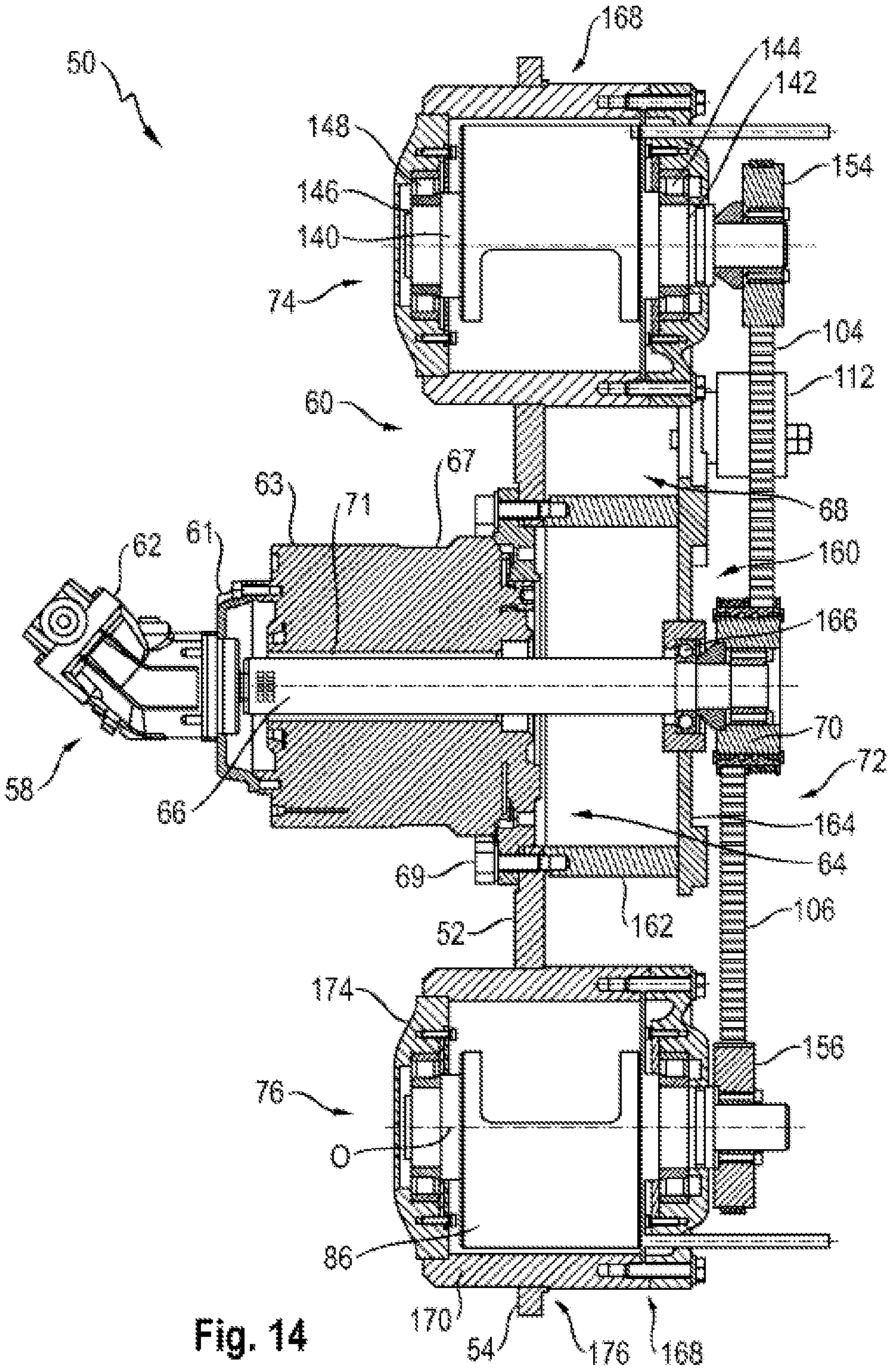
FIG. 14 shows a further alternative embodiment of an oscillation module integrated in a compacting roller.

A further alternative embodiment of an oscillation module constructed with two imbalance mass units 74, 76 is shown in FIG. 14. Also in the construction shown in FIG. 14, the rotating region 67 of the roller drive motor 65 is arranged on the first axial side 60 of the carrier 52 in the region of the central opening 64. A pot-like housing 160 is arranged on the second axial side 68 of the carrier 52. This comprises a circumferential wall 162 which surrounds the central opening 64. The screw bolts 69, which fix the rotating region 67 of the roller drive motor 65 on the carrier 52, are screwed into this circumferential wall 162, so that both the roller drive motor 65 and the pot-like housing 160 are connected to the carrier 52 by means of the screw bolts 69.

At an axial end of the circumferential wall 162 facing away from the carrier 52, a base 164 of the pot-like housing 160 is provided thereon, for example integrally formed therewith or fixed thereto by screwing. The belt tensioning rollers are rotatably supported on this pot-like base 164, of which the belt tensioning roller 112 can be seen in the upper region in FIG. 14 in association with the belt 104. Furthermore, the motor shaft 66 passing through the roller drive motor 65 in the region of its central opening 71 is rotatably mounted on the base 164 via a bearing 166. The motor shaft 66 supports the belt drive pulley 70 in the axial end region which extends beyond the base 164 or the bearing 166.

Each of the two oscillation mass units 74, 76 is constructed with an oscillation mass housing 168, which is constructed separately from the support 52 and is fixed to it, for example, by screwing or welding. Each oscillating mass housing 168 comprises a circumferential wall 170 fixed to the carrier 52 and two lid-like bases 172, 174 provided on the axial ends of the circumferential wall 170. These can be formed separately from the circumferential wall 170 and can be fixed to it, for example, by screwing. Alternatively, one of the bases 172, 174 could be integrally formed with the circumferential wall 170. A respective imbalance mass 86 with its imbalance shaft 140 is rotatably supported on the two bases 172, 174 via the imbalance mass bearing 144, 148.

The oscillation mass housings 168 are arranged in respective openings 176 of the carrier 52 approximately in an axial central region of the respective circumferential wall 170, such that the belt driven pulleys 154, 156 supported on the imbalance shafts 140 in the region of their axial end regions 142 are positioned in the axial region of the belt drive pulley 70 and can be connected to it via the belts 104, 106 for common rotation.

It should be noted that in the embodiment shown in FIG. 14, for example, the pot-like housing 160 is also provided in a structurally different configuration. Thus, the circumferential wall 162 can be provided with a plurality of webs, for example integrally formed with the base 164, which extend axially and are connected to the carrier 52 by the screw bolts 69.

In conclusion, it should be pointed out that, although the respective oscillation mass units are described and shown identically to one another in relation to the various embodiments, structurally different embodiments are also possible in principle. It is also possible, for example, to provide more than two oscillation mass units, for example a total of four oscillation mass units which are opposite each other in pairs with respect to the drive axis of rotation.

The invention claimed is:

1. An oscillation module for a compacting roller of a soil compactor, comprising:

a plate-like carrier, wherein the carrier has a connection formation for firmly connecting the carrier to a carrier structure of a compacting roller, at least two oscillation mass units supported on the carrier at a distance from one another, each oscillation mass unit comprising an imbalance mass rotatably supported on the carrier about an oscillation axis of rotation, an oscillation drive motor supported on the carrier, wherein each imbalance mass of each oscillation mass unit can be driven by the oscillation drive motor for rotation about the respectively assigned oscillation axis of rotation, wherein at least one oscillation mass unit comprises an imbalance mass bearing projection supported on the carrier and at least one imbalance mass rotatably supported on the imbalance mass bearing projection about the oscillation axis of rotation, wherein at least one imbalance mass comprises an imbalance mass ring body rotatably supported on the associated imbalance mass bearing projection and at least one imbalance mass element provided on the imbalance mass ring body, wherein an imbalance mass element is arranged on at least one imbalance mass on at least one axial end face of the imbalance mass ring body and detachably connected to the imbalance mass ring body.

2. An oscillation module according to claim 1, wherein at least one oscillation mass unit comprises an oscillation mass housing with a circumferential wall accommodated in an opening of the carrier and on both axial end regions of the circumferential wall in each case a base rotatably supporting an imbalance mass.

3. An oscillation module according to claim 1, wherein in at least one oscillation mass unit the imbalance mass bearing projection is supported on the carrier in its first axial end region and is self-supporting in its second axial end region, wherein an imbalance mass bearing has a bearing inner ring supported on the imbalanced mass bearing projection or provided by it and one bearing outer ring supported on the imbalance mass or provided by it.

4. An oscillation module according to claim 1, wherein a drive axis of rotation of the oscillation drive motor and the oscillation axes of rotation of at least two oscillation mass units are parallel to one another and/or lie in a common plane.

5. An oscillation module according to claim 1, wherein the connection formation comprises a plurality of connection bolt passage openings on an outer circumferential region of the carrier.

6. An oscillation module according to claim 1, wherein at least one imbalance mass is configured to be driven for rotation by the oscillation drive motor by a belt drive.

7. An oscillation module according to claim 6, wherein the belt drive, in association with at least one imbalance mass on the oscillation drive motor, comprises a belt drive pulley, which can be rotated about a drive axis of rotation, on the imbalance mass a belt driven pulley, and a belt, which interacts with the belt drive pulley and the belt driven pulley.

8. An oscillation module according to claim 7, wherein at least one imbalance mass of the imbalance mass ring body, provides the belt driven pulley.

9. An oscillation module according to claim 7, wherein the belt drive pulley interacts with at least two belts for driving at least two imbalance masses of different oscillation mass units, wherein the belt drive pulley has successive belt interaction regions for interacting with the at least two belts in the direction of the drive axis of rotation.

10. An oscillation module according to claim 9, wherein the imbalance mass ring bodies each providing a belt driven pulley are identical to one another and/or are positioned in the same axial region in the direction of the drive axis of rotation.

11. An oscillation module according to claim 6, wherein in association with at least one belt a belt tensioning roller is provided, wherein at least one belt tensioning roller increases a circumferential interaction length between the belt and the belt drive pulley and/or belt driven pulley cooperating therewith.

12. An oscillation module according to claim 1, wherein the oscillation drive motor comprises a motor housing supported on the carrier, positioned substantially on a first axial side of the carrier, and a motor shaft which penetrates an opening in the carrier and interacts with the oscillating mass units in a drive interaction on a second axial side of the carrier.

13. An oscillation module according to claim 12, wherein the oscillation mass units are arranged on the second axial side of the carrier.

14. An oscillation module according to claim 12, wherein the oscillation drive motor is supported on the carrier via a roller drive motor.

15. An oscillation module according to claim 12, wherein on the second axial side of the carrier, the opening in the carrier enclosing a pot-like housing which rotatably supports the motor shaft of the oscillation drive motor is arranged.

16. An oscillation module according to claim 14, wherein the housing is fixed to the carrier together with the roller drive motor.

17. An oscillation module according to claim 11, wherein at least one belt tensioning roller is supported on the housing.

18. An oscillation module according to claim 1, wherein at least one of:

at least one imbalance mass bearing projection is fixed to the carrier by a plurality of fastening elements, and at least one imbalance mass bearing projection is formed integral with the carrier.

19. A soil compactor, comprising at least one compacting roller rotatable about an axis of rotation with at least one oscillation module according to claim 1.

20. The soil compactor according to claim 19, wherein the at least one compacting roller comprises a roller jacket enclosing an interior, wherein in association with the at least one oscillation module in the interior, a preferably disc-like support structure which is torque-proof relative to the roller jacket is provided and the carrier of the at least one oscillation module with its connection formation is fixed to the support structure assigned to it.

21. The soil compactor according to claim 19, wherein two oscillation modules are arranged at a distance from one another in the direction of the axis of rotation of the roller in the compacting roller.

22. The soil compactor according to claim 19, wherein at least one compacting roller is a divided compacting roller with successive compacting roller sections in the direction of the roller axis of rotation, wherein at least one oscillation module is arranged in each compacting roller section, and/or in that at least one compacting roller is an undivided compacting roller, wherein an oscillation module is arranged in each axial end region of the compacting roller in such a way that it is substantially completely axially covered by a roller jacket of the compacting roller in the direction of the roller axis of rotation.

23. An oscillation module according to claim 1, wherein in at least one oscillation mass unit the imbalance mass bearing projection is supported on the carrier in its first axial end region and is supported in its second axial end region with respect to the imbalance mass bearing projection of at least one other oscillation mass unit or with respect to the carrier, wherein an imbalance mass bearing has a bearing inner ring supported on the imbalanced mass bearing projection or provided by it and one bearing outer ring supported on the imbalance mass or provided by it.

24. An oscillation module according to claim 1, wherein in that at least one imbalance mass on the associated imbalance mass bearing projection is rotatably supported by an imbalance mass bearing, wherein the imbalance mass bearing has a bearing inner ring supported on the imbalanced mass bearing projection or provided by it and one bearing outer ring supported on the imbalance mass or provided by it.

25. An oscillation module for a compacting roller of a soil compactor, comprising:

a plate-like carrier, wherein the carrier has a connection formation for firmly connecting the carrier to a carrier structure of a compacting roller, at least two oscillation mass units supported on the carrier at a distance from one another, each oscillation mass unit comprising an imbalance mass rotatably supported on the carrier about an oscillation axis of rotation, and an oscillation drive motor supported on the carrier, wherein each imbalance mass of each oscillation mass unit can be driven by the oscillation drive motor for rotation about the respectively assigned oscillation axis of rotation, wherein at least one oscillation mass unit comprises an oscillation mass housing with a circumferential wall accommodated in an opening of the carrier and on both axial end regions of the circumferential wall in each case a base rotatably supporting an imbalance mass.

* * * * *